Nov. 29, 1949     A. G. SHERMAN     2,489,594
FEEDING APPARATUS

Filed Oct. 6, 1945     2 Sheets-Sheet 1

INVENTOR
A.G.Sherman
BY
ATTORNEYS

Nov. 29, 1949  A. G. SHERMAN  2,489,594
FEEDING APPARATUS
Filed Oct. 6, 1945  2 Sheets-Sheet 2

INVENTOR
A. G. Sherman
BY
ATTORNEYS

Patented Nov. 29, 1949

2,489,594

UNITED STATES PATENT OFFICE 2,489,594

FEEDING APPARATUS

Arthur G. Sherman, Tracy, Calif.

Application October 6, 1945, Serial No. 620,787

1 Claim. (Cl. 198—102)

This invention relates generally to an improved material feeding apparatus, and in particular the invention is directed to, and it is an object to provide, novel apparatus for feeding material, such as cut green alfalfa from a receiving bin or pit to a dehydrator or other processing station.

Another object of this invention is to provide material feeding apparatus, as in the preceding paragraph, which is operative to receive, intermittently, truck loads of the material and to thereafter power convey such material in a manner so that intermittently received loads are spread out for constant and even delivery from the apparatus to the dehydrator, whereby surges of excess material followed by substantially a stoppage of delivery are avoided, as is desirable for practical and efficient operation of dehydrators.

A further object of the invention is to provide material feeding apparatus, of the type described, which includes a pair of horizontal endless conveyors, one delivering to the other, with a feed regulating rotary gate cooperating with said one endless conveyor adjacent its discharge end, and the other endless conveyor delivering to an upwardly inclined elevator conveyor having a rotary material spreader unit cooperating therewith; all whereby the material may be delivered to the dehydrator in a constant stream spread out to a predetermined thickness.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claim.

In the drawings similar characters of reference indicate corresponding parts in the several views.

Figure 1:
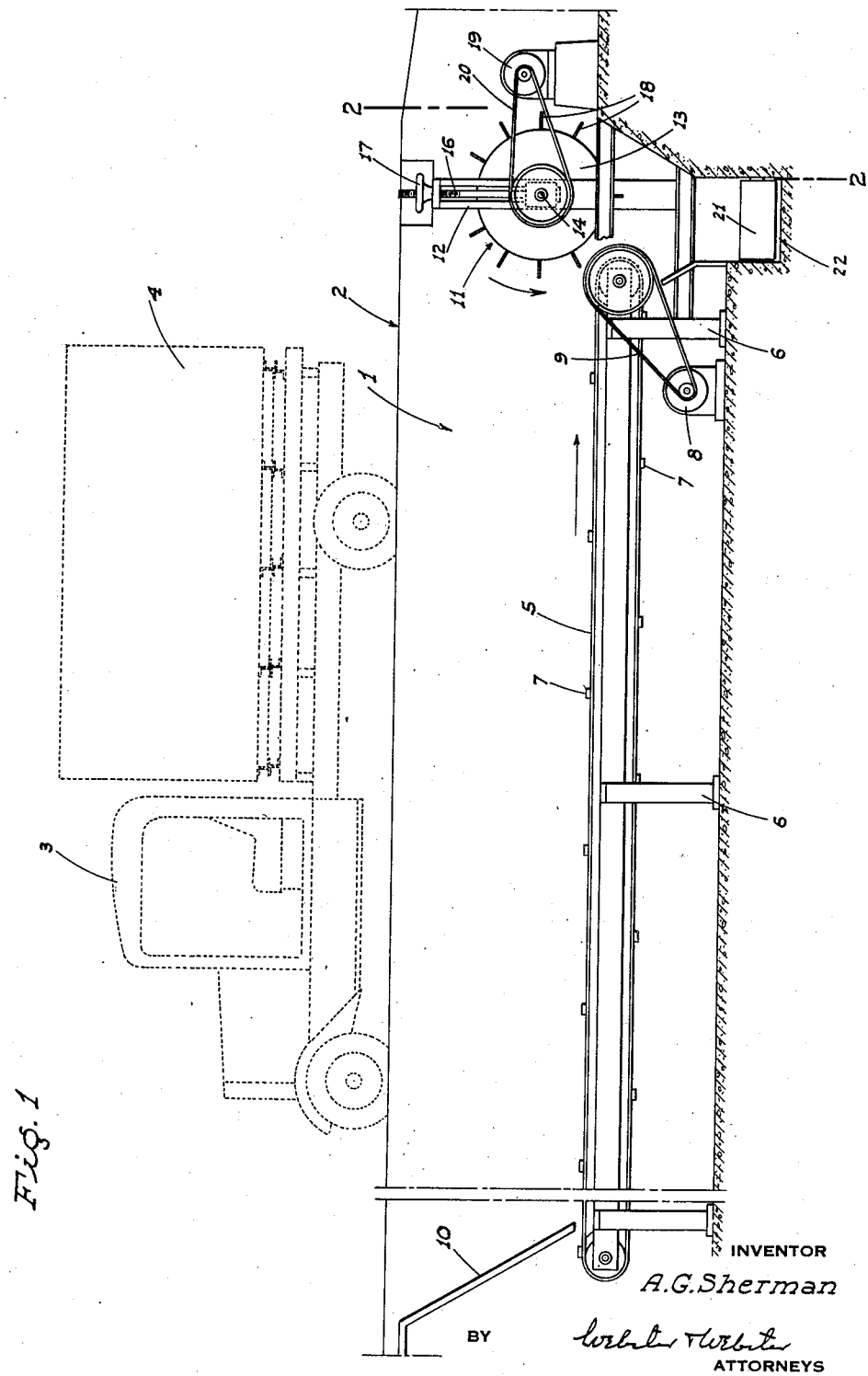
Figure 1 is a side elevation of the apparatus.

Referring now more particularly to the characters of reference on the drawings, the numeral 1 indicates a horizontally elongated open topped pit or channel-like container having a relatively elevated ramp 2 extending alongside thereof, whereby a truck 3 on said ramp may discharge its load into the pit 1. In the present embodiment the truck 3 is shown as including a dump body 4, which can readily discharge its load into the pit.

Adjacent the bottom of the pit 1 there is a horizontal, elongated endless belt conveyor 5 supported at intervals at spaced points along the length by standards 6. The endless belt of the conveyor 5 includes cross cleats 7 thereon, and said conveyor is driven, from one end and in the direction indicated by the arrow in Fig. 1, by means of an electric motor 8 coupled to said conveyor by a pulley and belt assembly, indicated generally at 9.

A baffle 10 extends across the pit 1 above the lead end of the upper run of the endless belt conveyor 5, while at the opposite or discharge end of said conveyor there is mounted a cooperating rotary gate, indicated generally at 11, and which comprises the following:

Beyond the discharge end of the endless belt conveyor 5 there is an upstanding frame 12 in which a relatively large diameter cylinder 13 is supported on a horizontal transverse axis; the cylinder 13 being of a length at least equal to the width of the belt of conveyor 5. The cylinder 13 is vertically adjustable and this is accomplished by journaling the ends of the cylinder shaft 14 in slide blocks 15 attached to vertical adjustment screws 16 having hand wheels 17 on the upper ends thereof. By manipulation of the hand wheels 17 the elevation of the cylinder 13, together with leveling thereof, is easily accomplished.

The cylinder 13 is provided with a plurality of circumferentially spaced, longitudinally extending rows of radial pins 18; the cylinder 13 being set so that said pins traverse a path, upon rotation of the cylinder, closely adjacent but clear of the discharge end of the endless belt conveyor 5.

The rotary gate 11 is driven, in the direction shown by the arrow in Fig. 1, by means of an electric motor 19 and a pulley and belt assembly, indicated generally at 20.

When a load of material, such as cut green alfalfa, is dumped from the body 4 of the truck 3 into the pit 1, the endless belt conveyor 5 moves such load toward its discharge end. However, the rotary gate 11 is so disposed and travels at such a speed as to prevent any surge of material off of the discharge end of the conveyor 5. To the contrary the rotary gate 11 causes discharge of the material from the endless belt conveyor 5 at a constant rate and volume. Thus, although the trucks discharge intermittently into the pit 1, the discharge from the endless belt conveyor 5 remains constant.

Figure 2:
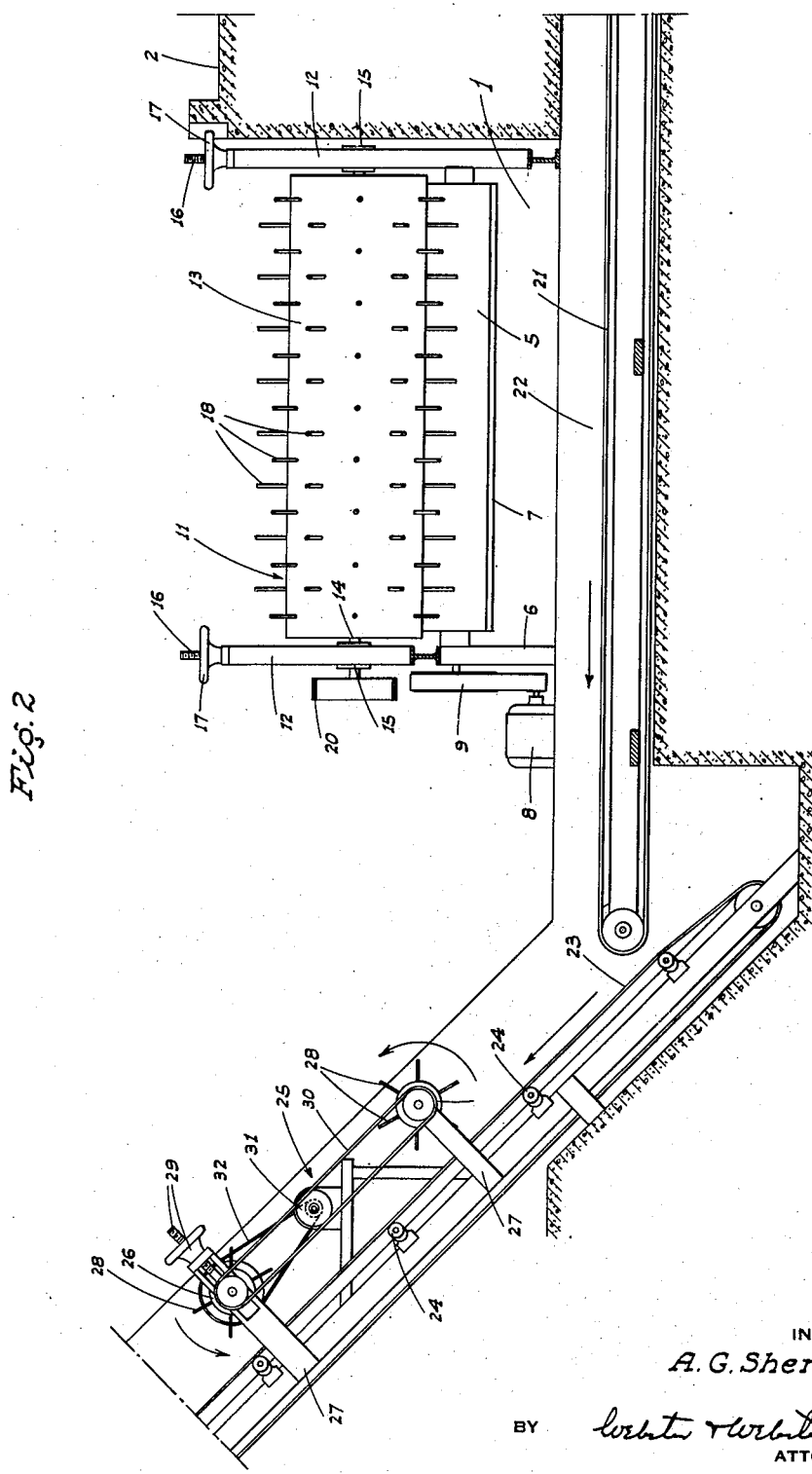
Figure 2 is a transverse section on line 2—2 of Fig. 1.

From the endless belt conveyor 5 the material feeds downwardly onto the upper run of a horizontal endless belt cross conveyor 21 disposed in a trough 22; the upper run of said cross conveyor traveling in the direction shown by the arrow in Fig. 2. At its discharge end the cross conveyor 21 delivers onto the upper run of an upwardly inclined endless belt elevator conveyor 23; said upper run being concavely supported by roller units 24.

The elevator conveyor 23 delivers to the dehydrator, and intermediate its ends said elevator conveyor has a rotary, material spreader unit 25 cooperating therewith, and which unit comprises the following:

A pair of horizontal, transversely extending cylinders 26 of relatively small diameter are journaled in connection with supporting frames 27, and each of said cylinders includes a plurality of longitudinally extending, circumferentially spaced rows of radial pins 28, which pins traverse a path adjacent but clear of the upper run of the elevator conveyor 23. The uppermost one of the cylinders 26 is mounted for adjustment relative to the conveyor 23 by screw and hand wheel means 29 similar to those employed in connection with the rotary gate 11. The cylinders 26 are coupled together, for simultaneous rotation, by means of an endless pulley and belt assembly 30; one of said cylinders being driven from an electric motor 31 by an endless belt 32. The cylinders 26 rotate, on the side adjacent the upper run of the conveyor 23, in a direction opposite thereto, whereby to produce a certain retarding effect on the material being carried and elevated by said upper run, and at the same time functioning to spread the material on said upper run to a thickness predetermined mainly by the adjustment of the uppermost cylinder 26. The rotary spreader unit 25 functions to not only serve as a supplementary regulation of the constant feed of the apparatus, but also provides the desirable spreading out of the material on the upper run of the elevator conveyor 23 before such material is delivered into the dehydrator.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as set forth herein.

Having thus described the invention, the following is claimed as new and useful and upon which Letters Patent are desired:

Feeding apparatus comprising a driven endless conveyor disposed in position to receive material thereon from above, a driven rotary gate, means mounting the rotary gate in cooperating relation to said conveyor adjacent its discharge end, a second conveyor disposed in a lower plane than the first conveyor and upon which the latter discharges, a driven upwardly inclined endless elevator conveyor adapted to receive and elevate material after its discharge from the second conveyor in a quantity regulated by the rotary gate, and a driven rotary material spreading unit mounted in cooperative relation above the elevator conveyor intermediate its ends, said spreading unit including a pair of spaced, transversely extending cylinders having a multiplicity of pins projecting outwardly therefrom, and means to simultaneously drive said cylinders with the portions thereof adjacent the elevator conveyor traveling in an opposite direction relative to the latter, one of said cylinders being mounted for adjustment toward or away from the elevator conveyor.

ARTHUR G. SHERMAN.

REFERENCES CITED

The following references are of record in the file of this patent:

UNITED STATES PATENTS

| Number | Name | Date |
| --- | --- | --- |
| 532,623 | Wright | Jan. 15, 1895 |
| 876,896 | Carroll | Jan. 14, 1908 |
| 1,305,607 | Johnson | June 3, 1919 |
| 1,760,490 | Grose | May 27, 1930 |
| 1,863,905 | Kuzell | June 21, 1932 |
| 2,133,396 | Neal | Oct. 18, 1938 |
| 2,230,018 | Stromstad | Jan. 28, 1941 |